(12) United States Patent
Hoedl et al.

(10) Patent No.: US 12,509,142 B2
(45) Date of Patent: Dec. 30, 2025

(54) STEERING SYSTEM COMPRISING A SHIELDED MAGNETIC TORQUE SENSOR DEVICE

(71) Applicants: thyssenkrupp Presta AG, Eschen (LI); thyssenkrupp AG, Essen (DE)

(72) Inventors: Benedikt Hoedl, Klaus (AT); Simon Dreher, Buchs (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 291 days.

(21) Appl. No.: 18/271,821

(22) PCT Filed: Jan. 6, 2022

(86) PCT No.: PCT/EP2022/050188
§ 371 (c)(1),
(2) Date: Jul. 11, 2023

(87) PCT Pub. No.: WO2022/152610
PCT Pub. Date: Jul. 21, 2022

(65) Prior Publication Data
US 2024/0067260 A1    Feb. 29, 2024

(30) Foreign Application Priority Data
Jan. 12, 2021   (DE) .................... 10 2021 200 207.2

(51) Int. Cl.
*B62D 5/04*    (2006.01)
*B62D 6/10*    (2006.01)
(52) U.S. Cl.
CPC ............. *B62D 5/0463* (2013.01); *B62D 6/10* (2013.01)
(58) Field of Classification Search
CPC ......... B62D 5/0463; B62D 6/10; G01L 3/104; G01L 5/221
See application file for complete search history.

(56) References Cited

U.S. PATENT DOCUMENTS

| 7,047,824 B2 * | 5/2006 | Nakane ................... G01L 5/221 73/862.331 |
| 9,448,129 B2 | 9/2016 | Yoshida et al. |

(Continued)

FOREIGN PATENT DOCUMENTS

| CN | 104053589 A | 9/2014 |
| CN | 110657910 A | 1/2020 |

(Continued)

OTHER PUBLICATIONS

English Translation of International Search Report issued in PCT/EP2022/050188, dated Apr. 6, 2022.

*Primary Examiner* — Octavia Hollington
(74) *Attorney, Agent, or Firm* — thyssenkrupp North America, LLC (57) ABSTRACT

An electromechanical steering system comprises a steering shaft, with a magnetic torque sensor device for measuring a torque applied to the steering shaft and with a shielding element. The steering shaft comprises an input shaft which can be rotationally fixedly connected to a steering handle and penetrates through the shielding element, and an output shaft which is connected to the input shaft via a twistable torsion bar. The torque sensor device comprises a multipole magnetic ring rotationally fixedly connected to the input shaft, a stator ring element rotationally fixedly connected to the output shaft and surrounding the magnetic ring, a magnetic flux collector and a sensor for detecting a magnetic flux density. The shielding element is arranged following the magnetic ring, the shielding element covering the surface of the magnetic ring and the stator ring element with respect to the steering handle.

12 Claims, 5 Drawing Sheets

(56) References Cited

U.S. PATENT DOCUMENTS

| | | | |
|---|---|---|---|
| 12,072,258 B2 * | 8/2024 | Ayer | ........................ B62D 3/12 |
| 12,209,925 B2 * | 1/2025 | Shigeta | ................... G01L 3/104 |
| 2003/0209087 A1 | 11/2003 | Nakane et al. | |
| 2017/0349211 A1 | 12/2017 | Shiino | |

FOREIGN PATENT DOCUMENTS

| | | | | |
|---|---|---|---|---|
| DE | 103 46 332 A1 | | 4/2004 | |
| DE | 102010064145 A1 * | | 2/2012 | ......... B62D 15/0215 |
| DE | 10 2017 116 454 A1 | | 1/2019 | |
| DE | 10 2018 112 840 A1 | | 12/2019 | |
| DE | 10 2018 131 712 A1 | | 6/2020 | |
| DE | 102019105234 A1 * | | 9/2020 | ............. G01L 3/104 |
| DE | 10 2019 205 270 A1 | | 10/2020 | |
| DE | 102015013965 B4 * | | 2/2022 | ........... B62D 5/0421 |
| JP | 2000346726 A | | 12/2000 | |
| JP | 2003-149062 A | | 5/2003 | |
| JP | 2007-93380 A | | 4/2007 | |
| JP | 2011-225 173 A | | 11/2011 | |

* cited by examiner

STEERING SYSTEM COMPRISING A SHIELDED MAGNETIC TORQUE SENSOR DEVICE

CROSS REFERENCE TO RELATED APPLICATIONS

This application is a U.S. National Stage Entry of International Patent Application Serial Number PCT/EP2022/050188, filed Jan. 6, 2022, which claims priority to German Patent Application No. DE 10 2021 200 207.2, filed Jan. 12, 2021, the entire contents of all of which are incorporated herein by reference.

FIELD

The present disclosure generally relates to an electromagnetic steering system with a steering shaft, with a magnetic torque sensor device for measuring a torque applied to the steering shaft.

BACKGROUND

Torque sensors are used in a motor vehicle in particular to measure the torque applied by the driver to the steering wheel. At present, torque sensor devices commonly used comprise magnetic sensors which react sensitively to external disruptive magnetic fields, which may lead to falsified measurement results. Because of the increasing electrification of motor vehicles, which are often already operated purely electrically, there is an increased risk that the measurement results of magnetic torque sensor devices may be influenced by the flowing electrical currents. Thus for example, current-carrying cables in the vicinity of the steering system, some of which conduct high electrical currents, may be the cause of such influencing of measurements. However, the Earth's magnetic field may also have a disruptive effect on a magnetic torque sensor device.

The prior art discloses magnetic torque sensor devices which have a magnetic shield for reducing external disruptive influences. For example, DE 10 2019 105 234 A1 discloses an electromechanical steering system with a magnetic torque sensor unit. This torque sensor unit comprises, contained within a housing, a ring magnet, several magnetic flux conductors and a sensor unit with a magnetic sensor arranged in a sensor housing. Furthermore, the torque sensor unit comprises a magnetic shielding which peripherally surrounds the sensor unit. The shield is clamped between the housing and a housing cover closing the housing. In this design, the shield must therefore be matched to the housing so that the clamping effect can be achieved. The shield cannot therefore be designed optimally in every respect.

Thus a need exists to provide an improved shield for a magnetic torque sensor device in an electromechanical steering system. In particular, an improved arrangement of the shielding element is achieved, preferably with improved functionality.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure concerns an electromagnetic steering system with a steering shaft, with a magnetic torque sensor device for measuring a torque applied to the steering shaft, and with a shielding element for reducing disruptive magnetic fields acting on the torque sensor device. For this, the steering shaft comprises an input shaft which can be rotationally fixedly connected to a steering handle, and an output shaft which is connected to the input shaft via a twistable torsion bar. The torque sensor device of the steering system comprises a multipole magnetic ring rotationally fixedly connected to the input shaft, a stator ring element rotationally fixedly connected to the output shaft and surrounding the magnetic ring, a magnetic flux collector and a sensor for detecting a magnetic flux density.

The proposed solution provides an electromechanical steering system which comprises a steering shaft, a magnetic torque sensor device for measuring a torque applied to the steering shaft, and a shielding element for reducing disruptive magnetic fields acting on the torque sensor device. The steering shaft comprises an input shaft which can be rotationally fixedly connected to a steering handle and penetrates through the shielding element, and an output shaft which is connected to the input shaft via a twistable torsion bar. Furthermore, the torque sensor device comprises a multipole magnetic ring rotationally fixedly connected to the input shaft, a stator ring element rotationally fixedly connected to the output shaft and surrounding the magnetic ring, a magnetic flux collector and a sensor for detecting a magnetic flux density. Here, the shielding element is arranged following the magnetic ring, said shielding element covering the surface of the magnetic ring and the stator ring element with respect to the steering handle. Preferably, the shielding element comprises a metal plate, wherein in particular it is provided that the shielding element is formed from a metal plate. According to an advantageous embodiment, the shielding element is formed in multiple pieces, in particular from multiple circle portions. In particular, the shielding element forms a closed surface, preferably a flat surface. The surface advantageously has a greater dimension than the magnetic ring and the stator ring, and advantageously also than the magnetic flux collector, so that the shielding element covers the surface of the magnetic ring and stator ring, advantageously also the magnetic flux collector, with respect of the steering handle. As a result, the shielding element covers the torque sensor device in particular completely when the steering shaft is oriented in the direction of view starting from the steering handle. The shielding element here advantageously conducts an external magnetic flux, in particular a magnetic flux acting from the direction of the steering handle, around the torque sensor device. Advantageously, it has been found that, in this way, fewer measurement errors are generated by the torque sensor device, and the torque applied to the steering shaft is thus advantageously detected with greater precision. Because the shielding element is arranged following the magnetic ring, and the shielding element advantageously thus adjoins the magnetic ring directly or at a distance in the longitudinal direction of the steering shaft, disruptive signals from the outside, in particular disruptive magnetic fields, are advantageously shielded. Thus advantageously, distortions of the output signal of the torque sensor due to external influences are greatly reduced or even avoided.

Advantageously, the shielding element has a magnetic permeability with a permeability of $\mu_r>200$, in particular with a permeability of $200<\mu_r<15000$. Advantageously, with such a permeability, a magnetic flux of a disruptive magnetic field is deflected better around the torque sensor device and hence the precision of measurement further improved. Further advantageously, the shielding element comprises a material with magnetically soft properties. In particular, it is provided that the shielding element at least partially comprises iron as a material. Thus the shielding effect of the shielding element is advantageously further improved.

In particular, it is provided that the steering system comprises a receiver unit in which the input shaft is rotatably mounted. Advantageously, the shielding element extends between the receiver unit and a portion of the input shaft. Advantageously, thus the shielding effect is further improved. Particularly advantageously, the portion of the input shaft is a protrusion of the input shaft. Advantageously, the shielding element may rest on the foot of the protrusion. Further advantageously, the portion is a projection from the input shaft. In particular, the portion may also be a diameter increase of the input shaft, wherein the shielding element advantageously rests against the portion. Advantageously, as a further function of the shielding element, this restricts the freedom of axial movement of the steering shaft, whereby advantageously, in the case of breakage of the torsion bar, the two broken halves and hence the input shaft and output shaft can move apart from one another at most to a very limited extent. Such a separation of the broken halves may otherwise occur, in particular with oblique broken edges, and then lead to further damage to the steering system. The advantageous arrangement of the shielding element, in which this is arranged with the one side face towards the receiver unit and the other side face towards the protrusion of the input shaft, and hence between the receiver unit and protrusion of the input shaft, advantageously acts as a block which largely or even completely prevents a movement of the input shaft in the direction of the steering handle.

The protrusion of the input shaft may in particular be a circumference enlargement of the input shaft, in particular a shoulder of the input shaft. The protrusion may be formed by the input shaft itself, but alternatively also by an element attached to the input shaft. The receiver unit is advantageously an inner tube of a telescopic steering column of the steering system. According to an advantageous embodiment, the shielding element extends between the inner tube and the protrusion of the input shaft, such that the shielding element covers the inner tube, in particular the opening of the inner tube, in particular completely, whereby the shielding effect is advantageously further improved. In particular, with this advantageous embodiment, a magnetic flux of a disruptive magnetic field from the inner tube is conducted into the input shaft, whereby advantageously the induced flux in the torque sensor device diminishes. A torque applied to the steering shaft may thus be determined more precisely.

According to an advantageous refinement, it is provided that the receiver unit serves as an end stop for an outer face of the shielding element. The outer face of the shielding element is here part of the side face turned towards the receiver unit, in particular an outer peripheral face. In particular, a circular shielding element is provided, wherein an inner ring or an outer ring of the shielding element is the outer face which rests against the receiver unit acting as the end stop. Advantageously, the freedom of axial movement of the steering shaft may thus be better restricted.

It is particularly advantageous that the shielding element is arranged on the receiver unit, in particular fixedly arranged on the receiver unit. The shielding element may here be arranged directly or indirectly via at least one further element. In particular, the shielding element may be arranged on the receiver unit via weld points. However, other suitable possible arrangements may be used.

According to a further advantageous embodiment of the disclosure, the shielding element is arranged closing a space between the receiver unit and the input shaft. In particular in an embodiment in which the receiver unit is an inner tube, the space between the input shaft and the inner casing surface of the input tube is closed at the point at which the shielding element is arranged. In particular, thereby the magnetic shielding of the torque sensor device is further improved. Also, such an embodiment is advantageously structurally easy to achieve.

A further advantageous embodiment provides that the input shaft penetrates orthogonally through the shielding element. In particular, it is provided that the side faces of the shielding element are each oriented orthogonally to the input shaft. Advantageously, this further simplifies production and mounting.

Further advantageously, the shielding element concentrically surrounds the input shaft. As well as further mounting advantages, this advantageously achieves a further improved shielding of the torque sensor device.

According to a further advantageous embodiment of the disclosure, the shielding element is arranged on the input shaft, in particular fixedly arranged on the input shaft. The shielding element may here be arranged directly or indirectly via at least one further element. In particular, the shielding element may be arranged on the input shaft via weld points. However, other suitable possible arrangements may be used. Particularly advantageously, the shielding element is arranged on a stepped region of the input shaft.

Advantageously, this arrangement achieves a further improvement in the restriction of the freedom of axial movement.

A further advantageous arrangement provides that the shielding element has a raised molding which coaxially surrounds a portion of the input shaft. In particular, it is provided that the raised molding is formed with a fluid transition starting from the side faces. The side faces preferably each form a closed flat surface with circular periphery. In an advantageous embodiment, the raised molding has a sleeve form. In particular, it is provided that the shielding element is arranged over the raised molding on the input shaft, wherein via the raised molding, in particular a press seat with the input shaft can be achieved. Advantageously, the raised molding achieves a better restriction of the axial movement freedom. In addition, advantageously, a magnetic flux from a disruptive magnetic field from the receiver unit, in particular from the receiver unit formed as an inner tube, can be conducted into the input shaft and hence disruptive influences in the magnetic torque sensor device can be further reduced.

Further advantageously, it is provided that the protrusion of the input shaft serves as an end stop for the raised molding of the shielding element. In particular, according to an advantageous embodiment of the disclosure, the input shaft has a diameter increase which serves as an end stop for the raised molding of the shielding element. Advantageously, this further limits the axial movement freedom of the steering shaft, in particular in the case of breakage of the torsion bar, or an already achieved restriction of the movement freedom of the steering shaft is made more secure against failure.

According to a further advantageous embodiment, the shielding element is designed in the form of a rosette. With such a design, advantageously a good shielding effect is achieved. This shape is additionally structurally advantageous and simple to produce.

In the various figures, the same parts usually carry the same reference signs and therefore are sometimes only explained in connection with one of the figures.

Figure 1:
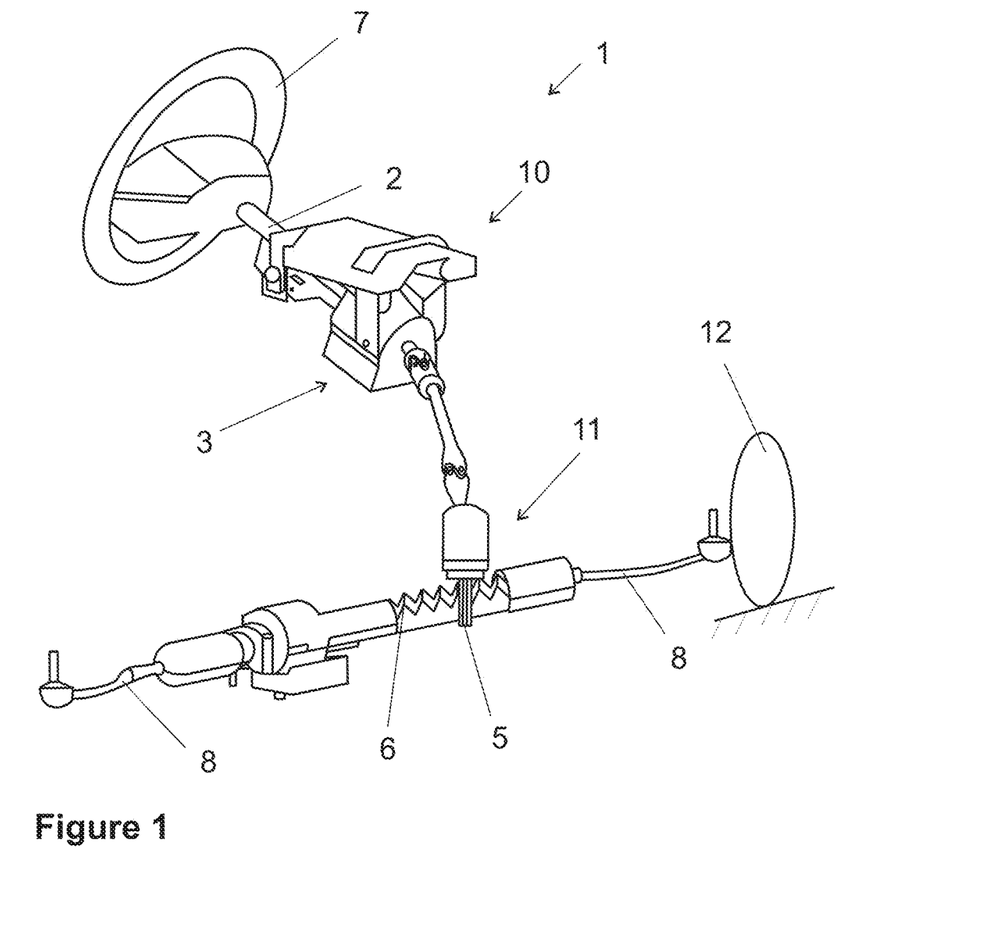
FIG. 1 shows a schematic, perspective view of an exemplary embodiment of an electromechanical steering system, configured according to the disclosure, of a motor vehicle.

FIG. 1 shows an electromechanical steering system 1 for a motor vehicle in a simplified perspective illustration. The steering system 1 comprises a steering column 10 with a steering shaft 2. The steering shaft 2 is mechanically coupled via a steering gear 11 to the steerable wheels 12 of a motor vehicle. The steering gear 11 in this exemplary embodiment comprises a pinion 5 and a toothed coupling rod 6, wherein the steering gear 11 serves to translate a rotational movement of the pinion 5 into a translational movement of the coupling rod 6 along its longitudinal axis. A steering handle 7, in particular a steering wheel, is rotationally fixed at the end of the steering shaft 2 facing the driver for input of a driver's steering request or steering command, wherein a driver can turn the steering handle 7, configured as a steering wheel, in the known fashion for input of his steering command. In this exemplary embodiment, the coupling rod 6, which is movable linearly along its longitudinal axis, is coupled mechanically to a track rod 8 on both sides of the motor vehicle. The track rods 8 are in turn each mechanically coupled to the vehicle wheels 12. The steering gear 11 is thus configured to convert a steering command, taking into account at least one input variable, into a steering movement of the steerable wheels 12 of the motor vehicle.

The steering system 1 furthermore comprises a magnetic torque sensor device 3 (not shown explicitly in FIG. 1) for measuring a torque applied to the steering shaft 3, and a shielding element (also not shown explicitly in FIG. 1) for reducing influences of external disruptive magnetic fields on the torque sensor device 3. The steering shaft 2 here comprises an input shaft (not shown in FIG. 1) which is rotationally fixedly connected to the steering handle 7 and penetrates through the shielding element, and an output shaft (not shown in FIG. 1) which is connected to the input shaft via a twistable torsion bar (not shown in FIG. 1). The torque sensor device 3 comprises a multipole magnetic ring (not shown in FIG. 1) which is rotationally fixedly connected to the input shaft, a stator ring element (not shown in FIG. 1) surrounding the magnetic ring and rotationally fixedly connected to the output shaft, a magnetic flux collector (not shown in FIG. 1) and a sensor (not shown in FIG. 1) for detecting a magnetic flux density. The shielding element is here arranged following the magnetic ring, said shielding element covering the surface of the magnetic ring and the stator ring element towards the steering handle 7. Advantageous embodiments for a steering shaft 2 with a torque sensor device 3 arranged thereon and with a shielding element are explained in more detail below, in particular with reference to a steering column 10, shown in the following figures, of a steering system 1.

Figure 2:
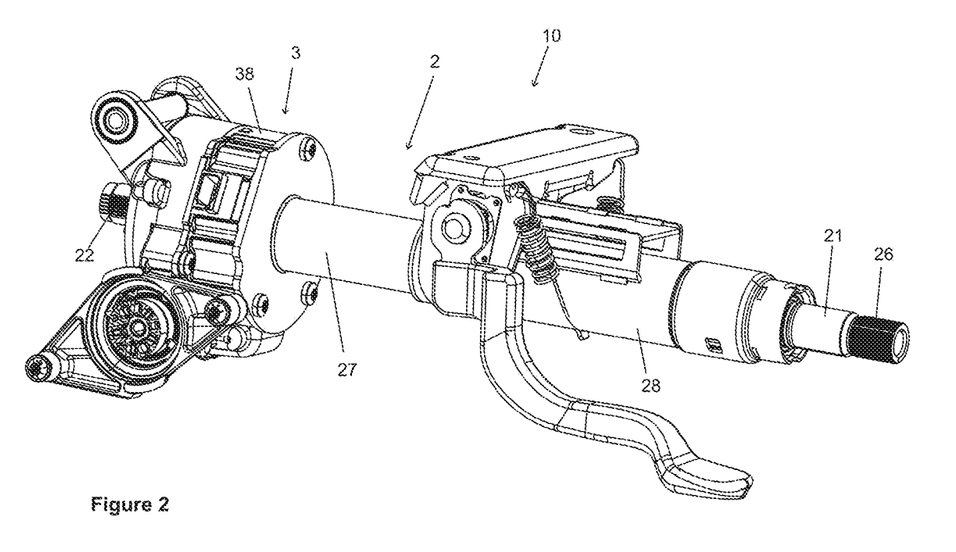
FIG. 2 shows a perspective view of an exemplary embodiment of a steering column, according to the disclosure, for a steering system.

For this, FIG. 2 shows an exemplary embodiment of a telescopic steering column 10 with a steering shaft 2, a magnetic torque sensor device 3 arranged in a housing 38, and a shielding element, which is not visible in FIG. 2. The steering column 2 comprises an input shaft 21, at the end 26 of which a steering handle can be arranged rotationally fixedly. The input shaft 21 is connected to an output shaft 22 of the steering shaft 2 via a twistable torsion rod (not visible in FIG. 2). The input shaft 21 is here mounted rotatably in a receiver unit 27 configured as an inner tube. To adjust the length of the steering column, the inner tube 27 may be received partly or completely by the outer tube 28.

Figure 3:
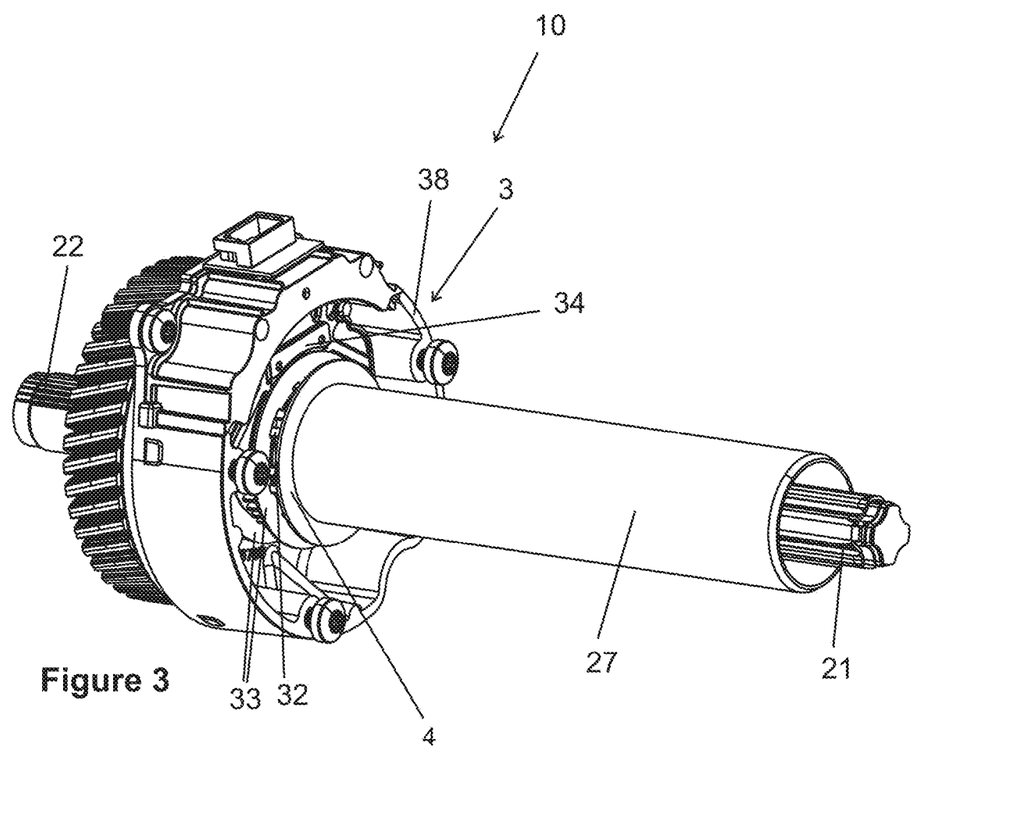
FIG. 3 shows a perspective view of a reduced drawing of the steering column of FIG. 2.
Figure 4:
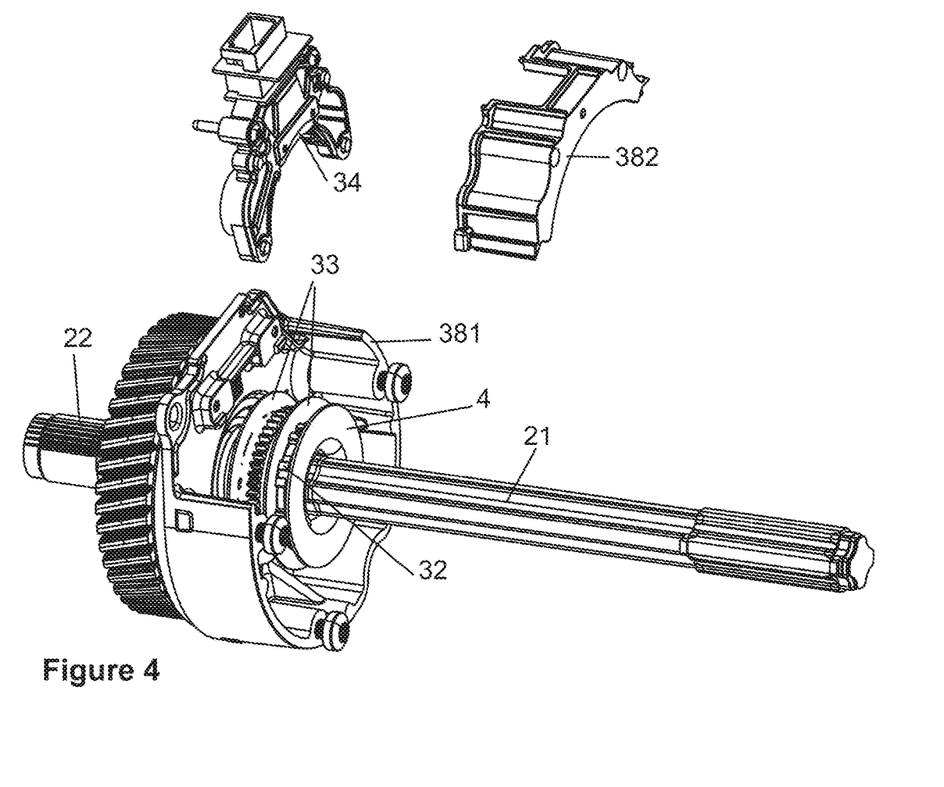
FIG. 4 shows a perspective view of a drawing, further reduced in comparison with FIG. 3, of the steering column FIG. 2.
Figure 5:
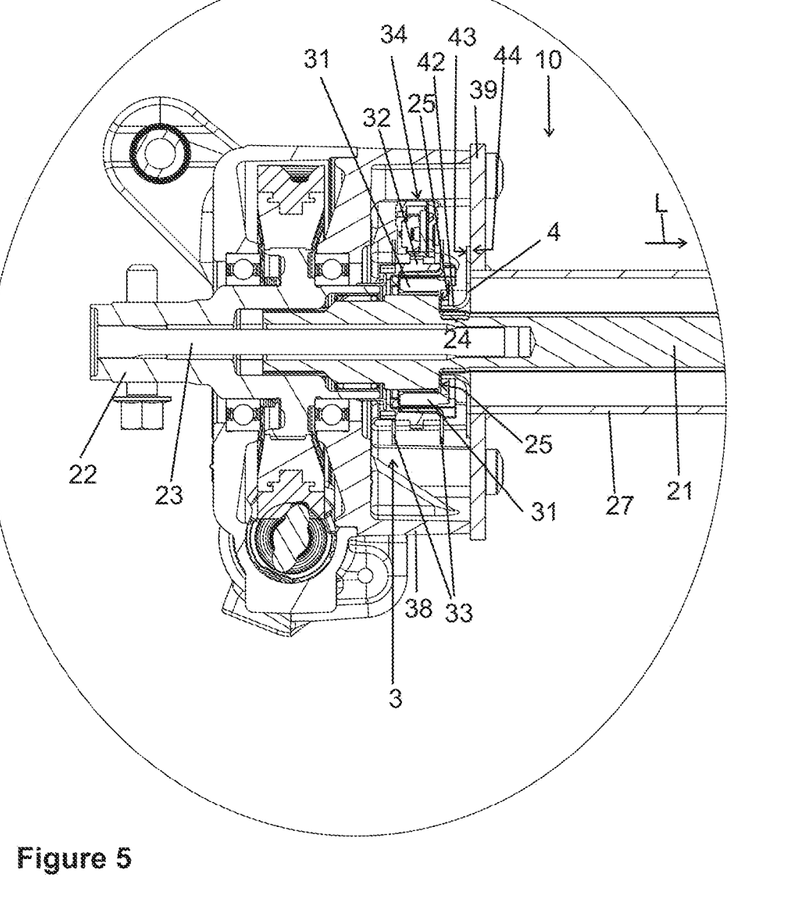
FIG. 5 shows a lateral, sectional view of an extract of the steering column of FIG. 2.

FIG. 3 and FIG. 4 show the steering column 10 from FIG. 2, wherein some elements have been omitted to reveal in particular the torque sensor device 3 and shielding element 4. Also, FIG. 5 shows in side view a section through the steering column 10 from FIG. 2, wherein the region of the steering column 10 with the torque sensor device 3, and a portion of the inner tube 27 with input shaft 21 mounted therein, are shown in FIG. 5.

FIGS. 3 and 4 here show the shielding element 4 and details of the magnetic torque sensor device 3 arranged in the housing 38 with housing parts 381, 382; these details include the stator ring element 32, which is rotationally fixedly connected to the output shaft 22 and surrounds the multipole magnetic ring (not visible in FIG. 3) rotationally fixedly connected to the input shaft 21, the magnetic flux collector 33 and the sensor 34, arranged in a sensor housing, for detecting a magnetic flux density. The sensor 34 may in particular be a Hall sensor. The input shaft 21 penetrates through the shielding element 4, which is arranged following the magnetic ring such that the shielding element 4 extends between the receiver unit 27, configured as an inner tube, and a protrusion of the input shaft 21 (not visible in FIG. 3 in FIG. 4) and hence superficially covers the magnetic ring and stator ring element 32 towards the end of the input shaft 21 at which the steering handle is arranged.

Figure 6:
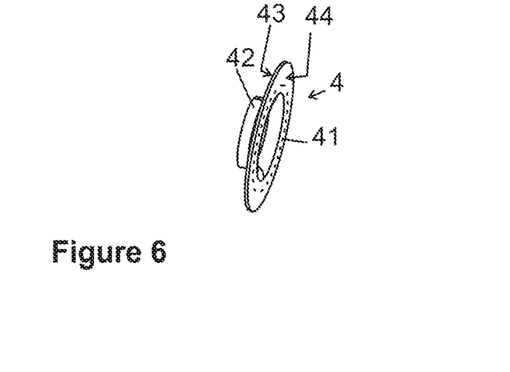
FIG. 6 shows a perspective view of an embodiment of a shielding element configured according to the disclosure.

An advantageous embodiment of the shielding element 4 is here shown in a perspective illustration in FIG. 6, in which the shielding element 4 takes the form of a rosette. The shielding element 4 comprises a material, preferably iron, with magnetically soft properties, and has a magnetic permeability with a permeability $\mu_r > 200$, in particular $\mu_r = 2000$. As evident in particular from FIG. 6, the shielding element 4 has a raised molding 42. This shielding element 4 furthermore has a first side face 43 pointing towards the torque sensor device 3, and a second side face 44 pointing in the direction of the steering handle or end 26 of the steering shaft 2. A fluid transition is formed between the raised molding 42 and the side faces 43, 44. The first side face 43 and second side face 44 each form a closed flat surface with a circular periphery. Accordingly, the torque sensor device 3 is covered by the shielding element 4 arranged on the input shaft 21, and thus shielded against disruptive magnetic fields.

In the embodiments shown in FIGS. 2 to 5, the raised molding 42 of the shielding element 4 is arranged on the input shaft 21, wherein the raised molding 42 coaxially surrounds a portion 24 of the input shaft 21. The input shaft 21 penetrates orthogonally through the shielding element 4 so that the side faces 43, 44 of the shielding element 4 are oriented orthogonally to the input shaft 21, and the shielding element 4 concentrically surrounds the input shaft 21.

As evident in particular from FIG. 5, the input shaft 21 is rotatably mounted in the receiver unit 27 configured as an inner tube. The shielding element 4, the sleeve-like raised molding 42 of which is arranged on the input shaft 21, extends between the receiver unit 27 and a protrusion 25 of the input shaft 21, wherein the protrusion 25 is formed as a stepped shoulder by a diameter increase of the input shaft 21. The raised molding 42 of the shielding element 4 coaxially surrounds the portion 24 of the input shaft 21, wherein the protrusion 25 of the input shaft serves as an end stop for the raised molding 42. Also, the shielding element 4 is arranged with a part of the side face 44 on the receiver unit 27, wherein the receiver unit 27 also serves as an end stop for the shielding element 4, and here extends between the receiver unit 27 and the protrusion 25 of the input shaft 21 such that the shielding element 4 completely covers the opening of the receiver unit 27. An outer face 41 of the side face 44 contacts a housing cover 39 of the housing 38.

Because of the design shown in FIG. 5, a magnetic flux from a disruptive magnetic field from the receiver unit 27 is conducted into the input shaft 21, so that the magnetic flux induced in the torque sensor device 3 by a disruptive magnetic field diminishes. Because the shielding element 4 rests both on a protrusion 25 of the input shaft 21 and also on the receiver unit 27, and both the protrusion 25 and also the receiver unit 27 serve as an end stop for the shielding element 4, the freedom of axial movement of the input shaft 21 and hence the steering shaft 2 is restricted, which is important above all in the case of an oblique breakage of the torsion bar 23. The shielding element 4 then prevents the broken edges of the torsion bar 23 from turning relative to one another, and hence prevents the input shaft 21 from being moved in the arrow direction L. The input shaft 21 and output shaft 22 can thus move apart from one another only to a very limited extent in the case of breakage of the torsion bar 23.

The exemplary embodiments illustrated in the figures and explained in connection therewith serve to explain the disclosure and do not restrict for this.

LIST OF REFERENCE SIGNS

1 Steering system
2 Steering shaft
21 Input shaft
22 Output shaft
23 Torsion bar
24 Portion of input shaft
25 Protrusion of input shaft
26 End of input shaft
27 Receiver unit (inner tube)
28 Outer tube
3 Torque sensor device
31 Magnetic ring
32 Stator ring element
33 Magnetic flux collector
34 Sensor
38 Housing of torque sensor device
381, 382 Housing parts of housing
39 Housing cover
4 Shielding element
41 Outer face of the shielding element
42 Raised molding of the shielding element
43, 44 Side face of the shielding element
5 Pinion
6 Coupling rod
7 Steering handle
8 Track rod
9 Magnetic ring
10 Steering column
11 Steering gear
12 Wheel
L Arrow direction (axial movement direction)

What is claimed is:

1. An electromechanical steering system comprising:
    a steering shaft, comprising a magnetic torque sensor device for measuring a torque applied to the steering shaft;
    a shielding element, wherein the steering shaft includes an input shaft which is configured to be rotationally fixedly coupled to a steering handle and penetrate through the shielding element;
    an output shaft coupled to the input shaft via a twistable torsion bar, and wherein the torque sensor device includes a multipole magnetic ring rotationally fixedly coupled to the input shaft;
    a stator ring element rotationally fixedly connected to the output shaft and surrounding the magnetic ring;
    a magnetic flux collector and a sensor for detecting a magnetic flux density, wherein the shielding element is arranged following the magnetic ring, the shielding element covering the surface of the magnetic ring and the stator ring element with respect to the steering handle; and
    a receiver unit in which the input shaft is rotatably mounted, wherein the shielding element extends between the receiver unit and a portion of the input shaft.

2. The steering system of claim 1, wherein the receiver unit serves as an end stop for an outer face of the shielding element.

3. The steering system of claim 1, wherein the shielding element is arranged on the receiver unit.

4. The steering system of claim 1, wherein the shielding element is arranged closing a space between the receiver unit and the input shaft.

5. The steering system of claim 1, wherein the input shaft penetrates orthogonally through the shielding element.

6. The steering system of claim 1, wherein the shielding element concentrically surrounds the input shaft.

7. The steering system of claim 1, wherein the shielding element is arranged on the input shaft.

8. The steering system of claim 1, wherein the shielding element has a magnetic permeability of $\mu_r > 200$.

9. The steering system of claim 1, wherein the shielding element comprises a material with magnetically soft properties.

10. The steering system of claim 1, wherein the shielding element includes a raised molding coaxially surrounding a portion of the input shaft.

11. The steering system of claim 10, wherein the input shaft has a diameter increase which serves as a stop for the raised molding of the shielding element.

12. The steering system of claim 1, wherein the shielding element is in the form of a rosette.

* * * * *